United States Patent [19]

Matsukawa et al.

[11] 3,970,585
[45] July 20, 1976

[54] PROCESS FOR PREPARING OIL-CONTAINING MICROCAPSULES

[75] Inventors: Hiroharu Matsukawa; Shizuo Katayama; Masataka Kiritani, all of Fujimiya, Japan

[73] Assignee: Fuji Photo Film Co., Ltd., Minami-ashigara, Japan

[22] Filed: Apr. 24, 1973

[21] Appl. No.: 354,050

Related U.S. Application Data

[63] Continuation-in-part of Ser. No. 295,329, Oct. 5, 1972, abandoned, which is a continuation of Ser. No. 43,868, June 5, 1970, abandoned.

[30] Foreign Application Priority Data

June 5, 1969  Japan.............................. 44-43597

[52] U.S. Cl.................................. 252/316; 264/4; 427/338; 428/307
[51] Int. Cl.²........................................ B01J 13/02
[58] Field of Search................ 252/316; 117/100 A, 117/62.2; 424/37; 427/338

[56] References Cited
UNITED STATES PATENTS

| | | | |
|---|---|---|---|
| 2,969,331 | 1/1961 | Brynko et al. | 252/316 |
| 3,154,494 | 10/1964 | Speak et al. | 117/100 A X |
| 3,494,872 | 2/1970 | Maierson et al. | 252/316 |
| 3,687,865 | 8/1972 | Katayama et al. | 252/316 |

Primary Examiner—Richard D. Lovering
Attorney, Agent, or Firm—Sughrue, Rothwell, Mion, Zinn & Macpeak

[57] ABSTRACT

In a process for preparing oil-containing microcapsules comprising cooling a coacervate dispersion of a gelatin-containing colloid deposited around individual oil droplets to cause gelation of the colloid and subsequently hardening the gelled colloid by adding to the dispersion a hardening agent and adjusting the pH to the alkaline region, the improvement which comprises adding to the dispersion, after gelation but prior to hardening, an aqueous solution of an anionic high molecular weight electrolyte and an aqueous solution of an anionic surface active agent. Specific electrolytes and specific surface active agents are disclosed.

7 Claims, 1 Drawing Figure

ADDITION AMOUNT OF CARBOXYMETHYL CELLULOSE TO DRY GELATIN

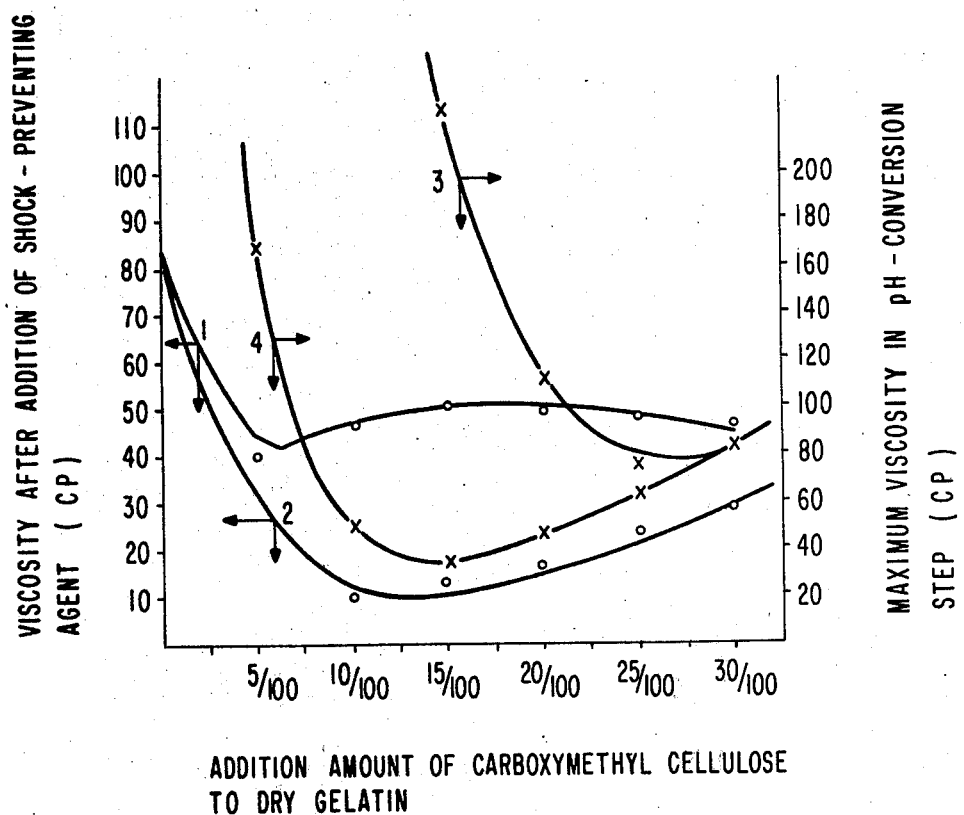

PROCESS FOR PREPARING OIL-CONTAINING MICROCAPSULES

CROSS-REFERENCE TO RELATED APPLICATION

The present application is a continuation-in-part application of Ser. No. 295,329 filed Oct. 5, 1972, now abandoned, which was, in turn a continuation application of Ser. No. 43,868 filed June 5, 1970, now abandoned.

BACKGROUND OF THE INVENTION

1. Field of the Invention

The present invention relates to a process for preparing microcapsules containing an oily liquid. More particularly, the present invention relates to a process for preparing microcapsules containing a hydrophobic oily liquid by using gelatin as at least one type of hydrophilic colloid in the complex coacervation method. The process is characterized by adding an aqueous solution of an anionic surface active agent in combination with a shock-preventing agent at a temperature lower than the gelling point of gelatin to prevent the increase of viscosity caused by the reaction of gelatin and the hardening agent during the hardening pretreatment process and promoting the hardening pretreatment.

As used herein, the term "hardening pretreatment" means the operation of rapidly converting the pH of the system to the alkaline region to promote the reaction of gelatin and the hardening agent. Typical examples of hardening agents include aldehydes such as formaldehyde, glutaraldehyde etc, glyoxal, methylglyoxal, aldehyde-modified starch, etc. The term "shock" as used herein, describes the phenomenon in which, in carrying out the hardening pretreatment of a coacervate containing an oily liquid, the viscosity is rapidly increased to such a point that the pH of the system is between 6 to 9, i.e., a phenomenon in which the microcapsules deposit on each other resulting in flocculation or coagulation as the viscosity is increased.

2. Description of the Prior Art

Conventionally known processes for preparing oil-containing microcapsules are described, for example, in the specification of U.S. Pat. No. 2,800,457 and Japanese Patent Publication No. 3875/62. The process of U.S. Pat. No. 2,800,457 comprises the steps of (1) emulsifying a water-immiscible oil in an aqueous solution of a first hydrophilic colloid to be ionized in water (the first sol), the emulsifying step, (2) admixing an aqueous solution of a hydrophilic colloid in the emulsion of (1) forming the second sol, the first sol having an electric charge opposite to that of the second sol, and either adding water thereto or adjusting the pH thereof to cause coacervation, thus obtaining coacervates wherein the complex colloid is fixed to (i.e., surrounds) the individual oil drops (the coacervation step), (3) cooling the coacervates to cause gelation thereof (the gelation step), and (4) adjusting the pH to from 9 to 11 and adding a hardening agent (the hardening treatment). However, although the specification states that, according to this process, the size of microcapsule decreases as the amount of water used is decreased, mononuclear microcapsules cannot be obtained. Thus, the control of the size of the microcapsule is limited to from 20 to 30 microns when the oil droplet size is within a range of from 5 to 6 microns. The process of the Japanese Patent Publication Gazette No. 3875/1962 is a process in which a thickener such as Acacia, Tragacanth, methylcellulose, carboxymethyl cellulose, magnesium aluminum silicate, polyglycol, glycerin, syrup, and the like, is added to accumulate a hydrophilic colloid surrounding the oil droplets in step (1) of the above described U.S. patent, i.e., the emulsifying step. According to this process, the coacervation can only be affected in a higher colloid concentration than that in the above mentioned U.S. patent even where the surface characteristics of the emulsified droplets are changed by coexistence with the thickener before the coacervation step. However, mononuclear microcapsules cannot be prepared. This is due to the fact that the particle size of the microcapsules produced have already been determined according to the condition of coacervation established and, even if an unsatisfactory coacervation system is established, the microcapsules are coagulated (shocked) in the hardening pretreatment step in hardening the coacervate wall.

Microcapsules containing the oily liquid, prepared according to either of these processes are multinuclear microcapsules in the form of a "grape" bunch, (as used herein the term "mononuclear" refers to a single emulsified oil droplet and the term "multinuclear" refers to aggregated emulsified oil droplets.) Such multinuclear microcapsules have the disadvantage that, when used in a pressure-sensitive copying paper utilizing the reaction of a leuco dye and a clay, the resolving power of the colored letters in copying using a plurality of sheets is deteriorated because of the large particles. When coating on a paper by means of an air knife, microcapsules prepared by these processes are subject to a classification action whereby the composition of the liquid is changed. Therefore the air pressure used must be elevated. Thus, an increase in coating speed is obstructed.

An object of the present invention is to provide a process for preparing mononuclear and/or multinuclear (especially mononuclear) microcapsules containing an oily liquid having a great resistance.

Another object of the present invention is to provide a process for preparing microcapsules containing an oily liquid, whereby an increase in viscosity during conversion of the pH to alkalinity is prevented, a rapid conversion of the pH is carried out, the coating speed is increased and the drying step is shortened.

SUMMARY OF THE INVENTION

These above objects of the present invention can be attained by forming a film of polyelectrolyte colloid (the above mentioned second sol) around a hydrophobic oily droplet in the coacervation process to make coacervates, and, after gelling the film of the coacervate wall, adding an aqueous solution of an anionic surface active agent in combination with a shock-preventing agent thereto.

Previously, it has been found that compounds such as carboxymethyl ethers (sodium salt), sulfate esters (sodium salt), and phosphate esters (sodium salt) of cellulose; carboxymethyl ethers (sodium salt), sulfate esters (sodium salt), and phosphate esters (sodium salt) of starch; carboxymethylethers (sodium salt) and sulfate esters of hydroxyethylcellulose; pectins; pectic acid; sodium salt of nucleic acids, polyvinylbenzene sulfonic acid derivatives; polyacrylic acid derivatives; naphthalene sulfonic acidformaline condensates; polyethylene oxides, and the like, are useful as a shock-preventing agent. Exemplary polyvinylbenzene sulfonic acid derivatives are copolymers of an alkali metal polyvinylbenzene sulfonate with (1) acryloyl morpholine, (2) acrylamide, (3) vinylpyrrolidone, (4) morpholino methyl acrylamide and (5) methoxymethylacrylamide. Specific examples are:

| Comonomer | alkali metal | mole % alkali metal polyvinylbenzene sulfonate in copolymer | intrinsic viscosity [3] (1 g/100 ml) |
|---|---|---|---|
| (1) | Potassium | 53.7 | 0.620 |
|  |  | 63.9 | 0.740 |
|  |  | 76.5 | 0.421 |
| (2) | " | 52.8 | 0.98 |
|  |  | 66.2 | 0.87 |
|  |  | 87.0 | 0.71 |
| (3) | " | 67.3 | 0.6 |
| (4) | " | 62.1 | 0.530 |
| (5) | " | 58.5 | 0.412 |

Exemplary polyacrylic acid derivatives are copolymers of an alkali metal polyacrylate with (6) acryloyl morpholine, (7) acrylamide, (8) vinylpyrrolidone, (9) morpholino methyl acrylamide and (10) methoxymethylacrylamide. Specific examples are:

| Comonomer | alkali metal | mole % alkali metal polyvinylbenzene sulfonate in copolymer | intrinsic viscosity [3] (1 g/100 ml) |
|---|---|---|---|
| (6) | Sodium | 50.6 | 0.710 |
|  |  | 58.2 | 0.662 |
|  |  | 69.5 | 0.463 |
| (7) | " | 63.1 | 0.826 |
|  |  | 75.5 | 0.641 |
|  |  | 82.6 | 0.385 |
| (8) | " | 51.6 | 0.583 |
| (9) | " | 63.5 | 0.641 |
| (10) | " | 68.5 | 0.685 |

It has now been found that the above objects of this invention can be effectively attained by combining an anionic surface active agent with a shock-preventing agent. That is, a reduction of viscosity and an elevation of viscosity during the period of the pH conversion step can be further prevented by adding a solution of a mixture of a shock-preventing agent and an anionic surface active agent to the system immediately before the pH conversion step, of adding an aqueous solution of a surface active agent to the system after the addition of an aqueous solution of a shock-preventing agent in comparison with the case of adding the aqueous solution of shock-preventing agent alone.

The anionic surface active agent of the present invention can be exemplified by the following general formulas (1)

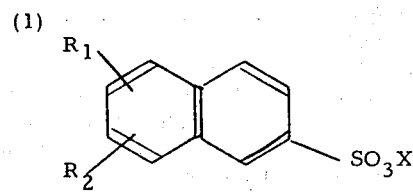

[Naphthalene Sulfonic Acid or Alkali Metal Naphthalene Sulfonate]

wherein $R_1$ represents a hydrogen atom, an alkyl group having from 1 to 18 carbon atoms, $R_2$ represents a hydrogen atom, an alkyl group having from 1 to 18 carbon atoms, or an alkoxyl group having from 1 to 18 carbon atoms, and X is a hydrogen atom or an alkali metal;

(2)

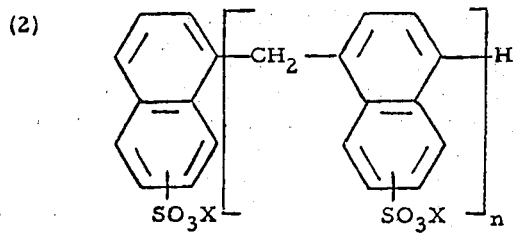

[Naphthalene Sulfonic Acid- (or Sulfonate)-Formalin Condensate]

wherein X represents a hydrogen atom or an alkali metal, and $n$ is an integer of from 1 to 9;

(3) $R(CH_2CH_2O)_nSO_3X$ [Polyoxyethylene Sulfonic Acid or Alkali Metal Polyoxyethylene Sulfonate]

wherein R represents an alkyl group having from 1 to 18 carbon atoms, an aryl group or an alkoxyl group having from 1 to 18 carbon atoms, X represents a hydrogen atom or an alkali metal, $n$ is an integer of from 5 to 25;

(4)

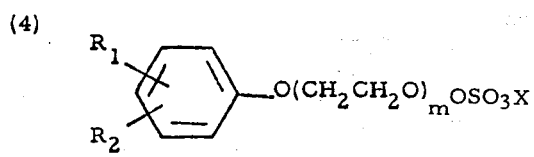

[Phenyl Polyoxyethylene Sulfuric Acid or Alkali Metal Phenyl Polyoxyethylene Sulfonate]

wherein $R_1$ represents a hydrogen atom or an alkyl group having from 1 to 18 carbon atoms, $R_2$ represents a hydrogen atom, an alkyl group having from 1 to 18 carbon atoms or an alkoxyl group having from 1 to 18 carbon atoms, $m$ is an integer of from 5 to 25, and X represents a hydrogen atom or an alkali metal; and (5) $\begin{matrix} R_1OOC-CH-SO_3X \\ | \\ R_2OOC-CH_2 \end{matrix}$ [Sulfosuccinic acid or Alkali Metal Sulfosuccinate]

wherein $R_1$ and $R_2$ each represent a hydrogen atom or an alkyl group having from 1 to 18 carbon atoms, and X represents a hydrogen atom or an alkali metal.

The amount of the shock-preventing agent to be used is preferably more than one-sixth by weight, based on the weight of dried gelatin, but can be more than one-twentieth when combined with the anionic surface active agent. Thereby the maximum viscosity during the pH conversion step can be decreased to less than one-third of that of the system in which an anti-shock agent alone is used.

The amount of the anionic surface active agent to be used in combination with the shock-preventing agent is dependent upon the amount of the shock-preventing agent although it preferably ranges from one-fiftieth to one-fifth by weight of the amount of gelatin. For example, in case of using the sodium salt of carboxymethyl cellulose (2 percent aqueous solution; viscosity at 25°C.: 13 cps; etherification degree: 0.72) as a shock-preventing agent and naphthalene sulfonic acid-formalin condensate as the anionic surface active agent, the amount of anionic surface active agent, by weight, ranges from one-twentieth to one-fifth of that of gelatin when the amount, by weight, of the shock-preventing agent is one-tenth that of gelatin and the amount, by weight, of the anionic surface active agent ranges from one-fiftieth to one-tenth when the shock-preventing agent is one-fifth that of gelatin. When the amount of the anionic surface active agent used is over the above range, the viscosity is increased during the pH conversion step.

BRIEF DESCRIPTION OF THE DRAWING

The FIGURE is a graph showing the value of viscosity after adding a shock-preventing agent to a microcapsule dispersion system and the maximum viscosity during the pH conversion step in the case of using carboxymethyl cellulose alone and using a combination of carboxymethyl cellulose and naphthalene sulfonic acid-formalin condensate. The abscissa shows the amount of carboxymethyl cellulose used, and the ordinate shows the maximum value of viscosity immediately after addition of the shock-preventing agent and during the pH conversion step. Curve 1 shows the viscosity of a microcapsule dispersion system immediately after adding carboxymethyl cellulose alone; Curve 2 shows the viscosity of the microcapsule dispersion system immediately after addition where carboxymethyl cellulose in combination with naphthalene sulfonic acid-formalin condensate is used; Curve 3 shows the maximum value of the viscosity during the pH conversion in the system shown in 1; and Curve 4 shows the maximum viscosity during the pH conversion in the system shown in 2. As can be seen from the graph, the system using carboxymethyl cellulose in combination with the naphthalene sulfonic acid-formalin condensate has a more remarkable effect in the lowering of the viscosity in comparison with the system using carboxymethyl cellulose alone. Coacervation was carried out under the following conditions:

| | |
|---|---|
| Coacervate Colloid: | Gelatin-Gum Arabic |
| Colloidal Ratio (by weight): | Gelatin/Gum Arabic = 1 |
| Coacervation pH | 4.3 |
| Coacervation Water: | 33.3 parts per part of gelatin |
| Gelatin: | Acid-trated Plgskin Gelatin Having an Isoelectric Point of 8.2 |

DESCRIPTION OF THE PREFERRED EMBODIMENTS

Thus, the present invention is an improvement of a well-known complex coacervation process for producing microcapsules. The preliminary steps of forming a coacervate dispersion of a complex gelatin-containing colloid (as the microcapsule wall material) deposited around individual oil droplets is well-known (see, e.g., Green et al. U.S. Pat. No. 2,800,457). It is also well known that, to obtain the product microcapsules, the coacervate dispersion is cooled to gel the complex gelatin-containing colloid followed by hardening thereof by adding thereto a hardening agent and adjusting the pH to the alkaline region (see, e.g., column 4, lines 17–19 of the above Green et al. patent) to promote hardening. The improvement is in adding to the dispersion, after gelation but prior to hardening, a combination of the anionic high molecular weight electrolyte shock-preventing agent and the anionic surface active agent identified above. The present invention is operable with any anionic high molecular weight electrolyte shock-preventing agent, the specific compounds described above being only exemplary of those included in the scope of the present invention.

Suitable surface active agents having the above-described general formulas are as follows: suitable alkali metal naphthalene sulfonates are methyl naphthalene potassium sulfonate, dodecyl naphthalene sodium sulfonate, 2-butyl-3-ethoxy-naphthalene sodium sulfonate, 2-ethoxy-naphthalene sodium sulfonate, and 2-hexyl-4-dodecyl naphthalene sodium sulfonate. The acid forms of these compounds are also suitable. The sodium or potassium salts of the naphthalene sulfonic acid-formalin condensates are suitable in addition to the free acid form of the condensate. Suitable alkali metal polyoxyethylene sulfonates are ethyl polyoxyethylene sodium sulfonate, dodecyl polyoxyethylene sodium sulfonate, octadecyl polyoxyethylene sodium sulfonate, phenyl polyoxyethylene sodium sulfonate, ethoxy polyoxyethylene sodium sulfonate, octadecoxy polyoxyethylene sodium sulfonate, and octoxy polyoxyethylene sodium sulfonate. The potassium salts and the free acid forms are also suitable. Suitable examples of the phenyl polyoxyethylene sulfuric acids are phenyl polyoxyethylene sulfuric acid, methyl phenyl polyoxyethylene sulfuric acid, methyl octadecyl phenyl polyoxyethylene sulfuric acid, and ethyl heptadecoxy phenyl polyoxyethylene sulfuric acid. The sodium and potassium salts of these acids are also suitable. Suitable sulfosuccinic acids are ethyl sulfosuccinic acid and octadecyl sulfosuccinic acid as well as their sodium and potassium salts.

The complex coacervation process caused by water dilution or pH adjustment will suffice to prepare microcapsules containing an oily liquid according to the present invention. The formation of complex coacervates by liquid-liquid phase separation is based on the operation of combining two or more kinds of hydrophilic colloid sols and separating one into a colloid rich phase and the other to a colloid poor phase. At this time the coacervated colloid must contain at least two kinds of hydrophilic colloids having opposite electric charges, at least one of which can be gelated.

Suitable hydrophilic colloids are exemplified by natural high molecular weight compounds, such as the gelatins, caseins, alginates or gum arabics, and synthetic high molecular weight compounds, such as styrenemaleic anhydride copolymers or polyethylene-maleic anhydride copolymers.

Suitable materials for the nucleus of the individual microcapsules are natural mineral oils, animal oils, vegetable oils, and synthetic oils, and the like. Suitable mineral oils are exemplified by petroleum and its fractions, for example kerosene, gasoline, naphtha, and paraffinic oils. As the animal oils, there are fish oils, and lard oil. Suitable vegetable oils are peanut oil, linseed oil, soybean oil, castor oil, and corn oil. Suitable synthetic oils are chlorinated diphenyl, chlorinated paraffin, tricresylphosphate, dibutylphthalate, and the like, and suitable organic solvents are toluene, benzene, and the like. Further, a solid such as wax or paraffin can be placed in the microcapsules.

In order to emulsify an oily liquid which is converted to the nuclear material in water, an anionic, cationic or non-ionic surface active agent is preferably used to prevent the formation of a water-in-oil type emulsion. An oil-in-water type emulsion can be obtained by emulsifying an oleaginous liquid which is converted to the nuclear material in a hydrophilic colloidal aqueous solution which becomes the wall material. The emulsified material affects the water dilution and the pH adjustment and accumulates the coacervates surrounding the emulsified oil droplet. At this point, to prepare mononuclear microcapsules it is preferable to have an insufficient coacervation condition. For example, sufficient approaches to achieve this are (1) a reduction in the amount of water used for dilution; (2) a deviation from the pH adjustment value from the value for obtaining the maximum yield of coacervates; (3) a change in the colloid ratio; and/or (4) an addition of an inorganic or organic metal salt; and the like. In general, mononuclear microcapsules can be sufficiently prepared by combining operations (1) and (2). If the adjusted pH value in (2) is the maximum value for obtaining the yield of coacervate, the amount of water to be used for dilution can be small, and, when a deviation from the adjusted pH optimum value is made it is sufficient if the amount of water for dilution is increased.

Since the addition of the inorganic or organic salt results in a reduction in coacervate yield, the establishment of other coacervation conditions is more preferable than the operation of (1) or (2).

The coacervate accumulated on the surface of the oil droplet after the coacervation step is cooled from the outside of the vessel to gelate the interface film. The pH of the system is adjusted to alkaline by the addition of formaldehyde to harden the wall film. With this prehardening treatment the microcapsule is coagulated under such insufficient coacervation conditions forming a mononuclear microcapsule if a shock-preventing agent is absent. The hardening of the microcapsule wall is by heating to increase the heat resistance strength of the formed microcapsule. The shock-preventing agent and the anionic surface active agent are added at a temperature lower than the gelling point of the gelation, i.e., below 20°C, and preferably below 15°C. The anionic surface active agent can be added to the system after the addition of the shock-preventing agent. These agents can be added simultaneously. According to the process of the present invention, mononuclear microcapsules can be obtained rapidly and with stable means using gelatin as at least one of the coacervated colloids.

The microcapsules prepared according to the process of the present invention are mononuclear microcapsules. Therefore, if the microcapsule is used in pressure-sensitive copying paper, on superposing it on a clay paper, processing stains and spots in a coated paper can be decreased (the pressure resistant strength of the capsule can be increased) in comparison with conventional multinuclear microcapsules. Further, the copying clearness of letters (the resolving power) in copying involving numerous sheets can be increased. The air pressure in air-knife coating can be lowered to reduce the classification of the capsules, and also the coating property of the liquid can be improved.

The present invention will be further illustrated by reference to the following examples but is not limited by them. All "parts" are "parts by weight".

EXAMPLE 1

10 parts of an acid-treated pigskin gelatin having an isoelectric point of 8.2 and 10 parts of gum arabic were dissolved in 50 parts of warm water at 40°C, and 0.15 part of Turkey red oil was added as an emulsifier. Next, 50 parts of chlorinated diphenyl were added to the aqueous solution of the gelatin-gum arabic under vigorous stirring for emulsification to form an oil-in-water type emulsion. The stirring was discontinued when the size of the oil droplets became 6 to 10 $\mu$. 310 parts of warm water at 40°C were added. An aqueous solution of 5 percent acetic acid was added dropwise under mild stirring to adjust the pH to 4.35. The colloid accumulated around the oil droplets was gelled and solidified by cooling from the outside of the vessel while continuing the stirring. Four parts of 37 percent aqueous formaldehyde solution were added when the liquid temperature reached 8°C.

Further, 25 parts of an aqueous solution (5 percent) of the sodium salt of carboxymethylcellulose (viscosity: 16 cps/2 percent aqueous solution at 25°C.; etherification degree 0.75) as a shock-preventing agent and 6 parts of a 20 percent naphthalene sulfonic acid-formalin condensate (Trade Mark: Lavelin S; made by Daiichi Seiyaku Co.), as an anionic surface active agent, were added thereto.

Two minutes after the addition, while continuing the stirring, a 10 percent aqueous solution of sodium hydroxide was added dropwise over 20 minutes to adjust the pH of the liquid to 10.5. The viscosity of the capsule dispersion increased with pH and reached the maximum point at a pH of between 7.5 to 8.0 and thereafter the pH decreased.

The stirring was further continued and the liquid temperature was raised to 40°C. for 15 minutes to harden the wall film, and a mononuclear microcapsule containing chlorinated diphenyl as the nucleus having a heat resistance of above 125°C. was obtained.

The viscosity of the capsule dispersion system in individual steps is as follows:

|  | No Shock-preventing Agent Used | Independent System Using Shock-preventing Agent Only | Shock-preventing Agent & Anionic Surface Active Agent Used |
|---|---|---|---|
| After Addition of Formaldehyde | 98 cp | 98 cp | 98 cp |

|  | No Shock-preventing Agent Used | Independent System Using Shock-preventing Agent Only | Shock-preventing Agent & Anionic Surface Active Agent Used |
| --- | --- | --- | --- |
| After Addition of Shock-preventing Agent | — | 76 cp | 68 cp |
| After Addition of Anionic Surface Active Agent | — | — | 47 cp |
| Maximum Viscosity During pH Conversion | Coagulate | 135 cp | 62 cp |

In the independent system 60 parts of a 5 percent aqueous solution of carboxymethyl cellulose were used as a shock-preventing agent. The viscosity was measured by means of Brookfield type rotation viscometer.

As is apparent from the above table, the system which does not contain a shock-preventing agent was coagulated in the pH conversion step.

The independent system of shock-preventing agent gave multinuclear microcapsules without coagulation during the pH conversion step.

Further, the system combining naphthalene sulfonic acid-formalin condensate, as the anionic surface active agent, was more remarkable in lowering viscosity and preventing an increase in viscosity both after addition and during the pH conversion step than that in the independent system.

EXAMPLE 2

Example 1 was repeated using 3 parts of the sodium salt of an alkylene naphthalene sulfonic acid (Trade Mark: Pelex NB; made by Kao Atlas Co.) in place of 6 parts of the 20 percent naphthalene sulfonic acid-formalin condensate and 50 parts of a 5 percent aqueous solution of the sodium salt of carboxymethyl cellulose in place of 25 parts of the 5 percent aqueous solution of the sodium salt of carboxymethyl cellulose. As a result, the effect of combining with sodium salt of alkylene naphthalene sulfonic acid was remarkable as shown in the following table.

|  | Independent System of Anti-shock Agent Only (using 65 parts of 5% carboxy methyl cellulose | Shock-Preventing Agent & Anionic Surface Active Agent |
| --- | --- | --- |
| Viscosity after Addition of Shock-Preventing Agent | 81 cp | 72 cp |
| Viscosity after Addition of Anionic Surface Active Agent | — | 56 cp |
| The Maximum Viscosity during the pH Conversion Step | 152 cp | 102 cp |

EXAMPLE 3

Example 2 was repeated using 2.5 parts of the sodium salt of polyoxyethylene alkylphenyl sulfonic acid (Trade Mark: Emal NC; made by Kao Atlas Co.), as an anionic surface active agent, in place of 3 parts of the sodium salt of alkylnaphthalene sulfonic acid. As the result, in case of combining with the sodium salt of poly-oxyethylene alkyl phenyl sulfonic acid, as shown in the following table, the viscosity was hardly increased and a mononuclear microcapsule was obtained.

|  | Independent System of Shock-Preventing Agent only (using 65 parts of 5% carboxymethyl cellulose) | Shock-Preventing Agent & Anionic Surface Active Agent |
| --- | --- | --- |
| Viscosity after Addition of Shock-Preventing Agent | 81 cp | 72 cp |
| Viscosity after Addition of Anionic Surface Active Agent | — | 48 cp |
| The Maximum Viscosity during the pH Conversion Step | 152 cp | 86 cp |

EXAMPLE 4

Example 1 was repeated using 20 parts of a 10 percent aqueous solution of the sodium salt of carboxymethyl-starch (raw material; corn starch; etherification degree: 0.52; viscosity: 55 cps at 20°C measured by means of a Brookfield rotation viscometer) as a shock-preventing agent in place of 25 parts of the 5 percent aqueous solution of the sodium salt of carboxymethyl cellulose.

As the result, shown in the following table, a mononuclear microcapsule was obtained without an increase of viscosity both after the addition and during the pH conversion step in comparison with the independent system using carboxymethyl-starch only.

|  | Independent System of Shock-Preventing Agent (using 25 parts of 10% carboxymethyl starch) | Shock-Preventing & Anionic Surface Active Agent |
|---|---|---|
| Viscosity after Addition of Shock-Preventing Agent | 65 cp | 59 cp |
| Viscosity after Addition of Anionic Surface Agent | — | 35 cp |
| Maximum Viscosity during pH Conversion | 134 cp | 58 cp |

EXAMPLE 5

Example 1 was repeated except that the combinations of shock-preventing agents and anionic surface active agents shown in the Tables 1 and 2 below were employed instead of the combination of the sodium salt of carboxymethylcellulose and naphthalene sulfonic acid-formalin condensate, respectively, used in Example 1. The viscosity values are shown in Table 3, and all of the combinations provided mononuclear microcapsules as compared to the use of the respective shock-preventing agents alone.

TABLE 1

| Compound No. | Shock-preventing Agent | Degree of Esterification | Degree of Etherification |
|---|---|---|---|
| 1 | Sulfated cellulose (sodium salt) | 0.75 | — |
| 2 | Phosphated cellulose (sodium salt) | 0.64 | — |
| 3 | Carboxymethylhydroxyethyl-cellulose (sodium salt) | — | 0.72 |
| 4 | Sulfated hydroxyethyl-cellulose (sodium salt) | 0.52 | — |
| 5 | Phosphated hydroxyethyl-cellulose (sodium salt) | 0.4 | — |
| 6 | Carboxymethyl-starch (sodium salt) | — | 0.65 |
| 7 | Sulfated starch (sodium salt) | 0.65 | — |
| 8 | Phosphated starch (sodium salt) | 0.45 | — |
| 9 | Pectin | — | — |
| 10 | Pectic acid | — | — |
| 11 | Copolymer of vinylbenzene sulfonate and acryloylmorpholine (potassium salt; vinylbenzene sulfonate 53.7 mol%) | — | — |
| 12 | Copolymer of acrylic acid and acryloylmorpholine (sodium salt; acrylic acid 50.6 mol%) | — | — |

TABLE 2

| Compound No. | Anionic Surface Active Agent |
|---|---|
| I | Dodecyl naphthalene sulfonic acid (sodium salt) |
| II | Naphthalene sulfonic acid-formalin condensate (sodium salt) |
| III | Polyoxyethylene dodecyl sulfonic acid (sodium salt) |
| IV | Methyl phenyl polyoxyethylene sulfur acid (sodium salt) |
| V | Diethyl ester of sulfosuccinic acid (sodium salt) | tions of shock-preventing agents and anionic surface

TABLE 3

| Shock-preventing Agent | Anionic Surface Active Agent | Viscosity After Adding Shock-preventing Agent | Maximum Viscosity during pH Conversion |
|---|---|---|---|
| 1 | — | 74 | 143 |
| 1 | III | 52 | 68 |
| 2 | — | 86 | 167 |
| 2 | II | 46 | 48 |
| 3 | — | 65 | 120 |
| 3 | V | 50 | 82 |
| 4 | — | 73 | 135 |
| 4 | I | 56 | 74 |
| 5 | — | 94 | 170 |

TABLE 3-continued

| Shock-preventing Agent | Anionic Surface Active Agent | Viscosity After Adding Shock-preventing Agent | Maximum Viscosity during pH Conversion |
| --- | --- | --- | --- |
| 5 | IV | 72 | 110 |
| 6 | — | 54 | 95 |
| 6 | II | 28 | 40 |
| 7 | — | 62 | 115 |
| 7 | IV | 41 | 63 |
| 8 | — | 71 | 130 |
| 8 | V | 48 | 74 |
| 9 | — | 85 | 170 |
| 9 | I | 65 | 120 |
| 10 | — | 90 | 175 |
| 10 | III | 67 | 115 |
| 11 | — | 78 | 164 |
| 11 | II | 45 | 77 |
| 12 | — | 85 | 158 |
| 12 | V | 70 | 115 |

As is apparent from the above tables, particularly Table 3, the viscosity of the microcapsule dispersion system containing a combination of a shock-preventing agent and an anionic surface active agent, was more effective in lowering viscosity and preventing an increase in viscosity both after addition and during the pH conversion step than that of the microcapsule dispersion system containing only shock-preventing agents.

EXAMPLE 6

Ten parts of an acid-processed gelatin having an isoelectric point of 8.2 and 6 parts of gum arabic were dissolved in 45 parts of warm water at 40°C. To the resulting colloidal aqueous solution was added 70 parts of alkylated naphthalene (Trade Name: KMCF; made by Kureha Chemical Industry Co., Ltd.) containing 2.0 percent (by weight) CVL (Crystal Violet Lactone) under vigorous stirring for emulsification to form an oil-in-water emulsion. Thus, oil droplets of 4 – 10 $\mu$ in size were obtained. A homo mixer was employed as a stirrer. (Emulsion solution).

Separately, 280 parts of a warm water at 40°C. was prepared in another vessel. To this was added 20 parts of a 5 percent solution of Scripset 500 (Trade Name; made by Monsanto Chemicals, Ltd.; sodium salt of styrenemaleic anhydride copolymer), and further, a 20 percent sodium hydroxide solution was added thereto to adjust the pH to 9.5. (Diluted high molecular weight electrolyte solution).

The following steps were all conducted while continuing the stirring. That is, the resulting emulsion solution was added to the diluted high molecular weight electrolyte solution under stirring, which was continued until the system became uniform. Thereafter, 10 percent HCl as added dropwise thereto to adjust the pH to 5.0, and the system was cooled from outside the vessel to form microcapsule wall films and gel the formed wall films.

When the temperature of the liquid became 15°C., 5 parts of a 37 percent formaldehyde aqueous solution was added thereto. Then, the system was further cooled and, at 8°C., 25 parts of a 10 percent aqueous solution of carboxymethyl cellulose sodium salt (viscosity: 18 cps/2 percent aqueous solution at 25°C.; etherification degree: 0.82) as a shock-preventing agent, and 4 parts of a 20 percent naphthalenesulfonic acid-formalin condensate (Trade Name: Demol N; made by Kao Atlas Co.) as an anionic surface active agent were added thereto. After uniformly mixing, a 10 percent aqueous solution of sodium hydroxide was added dropwise thereto over 40 minutes to adjust the pH of the liquid to 10.5.

In order to harden the wall film, the liquid temperature was raised to 45°C. The thus obtained microcapsules had such heat-resistance that they retained the content even when placed in a dryer at 100°C. for 10 hours.

EXAMPLES 7 – 10

Similar microcapsules were obtained by repeating Example 6 except for changing the "diluted high molecular electrolyte solution" to the following: (Examples 7 – 10).

| Example 7 | Water at 40°C | 280 parts |
| --- | --- | --- |
| | 5% Methyl vinyl ether-maleic anhydride copolymer | 10 parts |
| Example 8 | Water at 40°C. | 280 parts |
| | 5% Maleic anhydride-vinyl acetate copolymer | 10 parts |
| Example 9 | Water at 40°C. | 280 parts |
| | 5% Aqueous solution of sodium salt of polyethylene carboxyl-modified to the extent of 10% | 15 parts |
| Example 10 | Water at 40°C | 280 parts |
| | 10% Aqueous solution of sodium salt of polyacrylic acid ethyl-esterified to the extent of 60% | 10 parts |

The viscosities during the step of the prehardening treatment in the above-described Examples 6–10 are tabulated below.

TABLE 4

| Example | 6 | 7 | 8 | 9 | 10 |
| --- | --- | --- | --- | --- | --- |
| Viscosity at 8°C. (centipoises) | 48 | 62 | 58 | 61 | 75 |
| Viscosity after addition of shock-preventing agent & anionic surfactant (centipoises) | 38 | 46 | 42 | 46 | 52 |
| Maximum viscosity during pH conversion (centipoises) | 42 | 57 | 48 | 52 | 74 |

What is claimed is:

1. In a process for preparing oil-containing microcapsules comprising:

1. cooling a coacervate dispersion comprising a complex gelatin-containing colloid deposited around individual oil droples to cause gelation of the colloid;
2. thereafter adding to the dispersion an aqueous solution of a shock-preventing agent comprising an anionic high molecular weight electrolyte; and
3. subsequently hardening the gelled colloid by adding to the dispersion a hardening agent and adjusting the pH toward the alkaline region to promote hardening; the improvement comprising adding to the dispersion, after said step (1) and prior to said step (3), a combination of said aqueous solution of said shock-preventing agent consisting essentially of an anionic high molecular weight electrolyte selected from the group consisting of a sodium salt of a sulfuric acid ester of cellulose, a sodium salt of a phosphoric acid ester of cellulose; a sodium salt of a carboxymethyl ether of starch; a sodium salt of a carboxymethyl ether of hydroxy ethyl cellulose; a sulfuric acid ester of hydroxyethyl cellulose; a phosphoric acid ester of hydroxyethyl cellulose; pectin; pectic acid; a potassium salt of a copolymer of vinylbenzene sulfonate and acryloylmorpholine; and a sodium salt of a copolymer of acrylic acid and acryloylmorpholine, and an aqueous solution of an anionic surface active agent selected from the group consisting of:

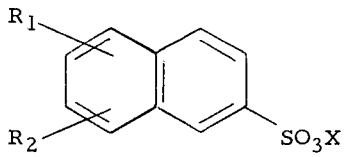

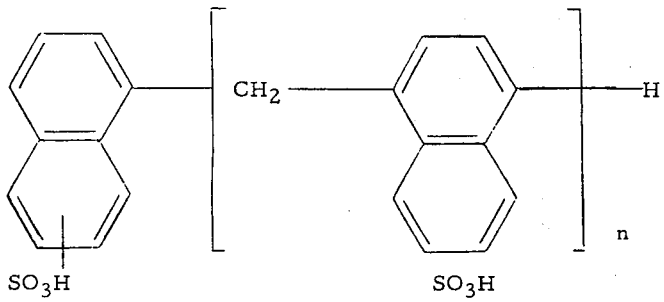

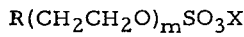

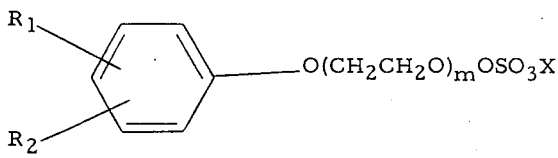

and

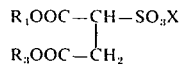

wherein $R_1$ and $R_3$ are selected from the group consisting of a hydrogen atom and an alkyl group having from 1 to 18 carbon atoms; wherein $R_2$ is selected from the group consisting of a hydrogen atom, an alkyl group having from 1 to 18 carbon atoms, and an alkoxy group having from 1 to 18 carbon atoms; where R is selected from the group consisting of an alkyl group having from 1 to 18 carbon atoms, an aryl group and an alkoxy group having from 1 to 18 carbon atoms, wherein X is selected from the group consisting of a hydrogen atom and an alkali metal atom; wherein $n$ is an integer ranging from 1 to 9; and wherein $m$ is an integer ranging from 5 to 25, said anionic surface active agent and said anionic high molecular weight electrolyte being different substances, and said electrolyte being used in an amount of at least one-twentieth and said anionic surface active agent being used in an amount of one-fiftieth to one-fifth of the amount by weight of the gelatin of the complex colloid.

2. The process as claimed in claim 1, wherein said anionic surface active agent is a naphthalene sulfonate selected from the group consisting of methylnaphthalene potassium sulfonate, dodecylnaphthalene sodium sulfonate, 2-butyl-3-ethoxy naphthalene sodium sulfonate, 2-epoxy-naphthalene sodium sulfonate, and 2-hexyl-4-dodecyl naphthalene sodium sulfonate, and the acid forms of said sulfonates.

3. The process as claimed in claim 1, wherein said anionic surface active agent is a polyoxyethylene sulfonate selected from the group consisting of sodium and potassium salts of ethyl polyoxyethylene sulfonate, dodecyl polyoxyethylene sulfonate, octadecyl polyoxyethylene sulfonate, phenyl polyoxyethylene sulfonate, ethoxy polyoxyethylene sulfonate, octadecoxy polyoxyethylene sulfonate, and octoxy polyoxyethylene sulfonate and the free acids of said sulfonates.

4. The process as claimed in claim 1, wherein said anionic surface active agent is selected from the group consisting of the sodium and potassium salts of ethyl sulfosuccinate and octadecyl sulfosuccinate and the acid forms of said succinates.

5. The process as claimed in claim 1, wherein said anionic surface active agent is selected from the group consisting of phenyl polyoxyethylene sulfuric acid, methyl phenyl polyoxyethylene sulfuric acid, methyl octadecyl phenyl polyoxyethylene sulfuric acid, ethyl heptadecoxy phenyl polyoxyethylene sulfuric acid, and the sodium and potassium salts thereof.

6. The process as claimed in claim 1 wherein the coacervate dispersion is prepared by emulsifying a water-immiscible oil in an aqueous solution of a first colloid to form a first sol ionizable in water; mixing said first sol with an aqueous solution of a second hydrophilic colloid to form a second sol ionizable in water, said second sol having an electric charge opposite that of said first sol, one of said first and said second hydrophilic colloids being gelatin; and adding water thereto or adjusting the pH thereof to cause coacervation, forming said coacervate dispersion wherein said complex gelatin-containing colloid is deposited around individual oil droplets.

7. The process as claimed in claim 1, wherein said anionic surface active agent is selected from the group consisting of a sodium salt of dodecyl naphthalene sulfonic acid, a sodium salt of naphthalene sulfonic acid-formalin condensate, a sodium salt of polyoxyethylene dodecyl sulfonic acid, a sodium salt of methyl phenyl polyoxyethylene sulfuric acid, and a sodium salt of diethyl ester of sulfosuccinic acid.

* * * * *